US012723933B2

(12) United States Patent
Song et al.

(10) Patent No.: US 12,723,933 B2
(45) Date of Patent: Sep. 1, 2026

(54) COMBINED STRUCTURE FOR THIN FILM SPUTTERING HIGH-PRECISION SIX-DIMENSIONAL FORCE SENSOR

(71) Applicant: SOUTHEAST UNIVERSITY, Jiangsu (CN)

(72) Inventors: Aiguo Song, Jiangsu (CN); Jingjing Xu, Jiangsu (CN); Yuhan Chen, Jiangsu (CN); Baoguo Xu, Jiangsu (CN); Huijun Li, Jiangsu (CN)

(73) Assignee: SOUTHEAST UNIVERSITY, Jiangsu (CN)

( * ) Notice: Subject to any disclaimer, the term of this patent is extended or adjusted under 35 U.S.C. 154(b) by 264 days.

(21) Appl. No.: 18/655,303

(22) Filed: May 5, 2024

(65) Prior Publication Data

US 2024/0328873 A1 Oct. 3, 2024

Related U.S. Application Data

(63) Continuation of application No. PCT/CN2023/089137, filed on Apr. 19, 2023.

(30) Foreign Application Priority Data

Apr. 3, 2023 (CN) ......................... 202310345929.7

(51) Int. Cl.
*G01L 1/22* (2006.01)
*G01L 5/16* (2020.01)
(Continued)

(52) U.S. Cl.
CPC .......... *G01L 1/2206* (2013.01); *G01L 1/2262* (2013.01); *G01L 1/2287* (2013.01);
(Continued)

(58) Field of Classification Search
CPC ......... G01L 5/1627; G01L 5/16; G01L 5/161; G01L 5/162; G01L 1/2206; G01L 1/2262; G01L 1/2287
See application file for complete search history.

(56) References Cited

U.S. PATENT DOCUMENTS 9,448,128 B2 * 9/2016 Kim ...................... G01L 5/1627
10,520,380 B2 * 12/2019 Li ......................... G01L 5/1627
(Continued)

FOREIGN PATENT DOCUMENTS

CN 103076131 5/2013
CN 107044898 8/2017
(Continued)

OTHER PUBLICATIONS

"International Search Report (Form PCT/ISA/210) of PCT/CN2023/089137," mailed on Dec. 26, 2023, pp. 1-5.
(Continued)

*Primary Examiner* — Jonathan M Dunlap
(74) *Attorney, Agent, or Firm* — JCIPRNET

(57) ABSTRACT

A combined structure of a thin film sputtered high-precision six-dimensional force sensor includes a cross beam, a double U-shaped beam, a base, a top cover, a bottom cover and thin film strain gauges. Strain gauges are sputtered on the main beam to form six sets of Wheatstone bridges, with three sets on the cross beam and three sets on the double U-shaped beam. The measurement method of the six-dimensional force sensor is that: an input force/moment of a certain dimension acts on the center of the cross beam and the center of the double U-shaped beam, so that the sensor is deformed and resistance values of strain gauges at corresponding positions change, thereby changing output voltages of corresponding bridges.

2 Claims, 5 Drawing Sheets

(51) Int. Cl.
*G01L 5/161* (2020.01)
*G01L 5/162* (2020.01)
*G01L 5/1627* (2020.01)

(52) U.S. Cl.
CPC ................ *G01L 5/16* (2013.01); *G01L 5/161* (2013.01); *G01L 5/162* (2013.01); *G01L 5/1627* (2020.01)

(56) References Cited

U.S. PATENT DOCUMENTS

| | | | | |
|---|---|---|---|---|
| 11,920,993 | B1 * | 3/2024 | Song ......................... | G01L 1/18 |
| 2015/0135856 | A1 | 5/2015 | Kim et al. | |

FOREIGN PATENT DOCUMENTS

| | | |
|---|---|---|
| CN | 109238527 | 1/2019 |
| CN | 208818385 | 5/2019 |
| CN | 114894364 | 8/2022 |
| CN | 115683434 | 2/2023 |
| CN | 115711698 | 2/2023 |
| GB | 1331581 | 9/1973 |
| JP | 2000227373 | 8/2000 |

OTHER PUBLICATIONS

"Written Opinion of the International Searching Authority (Form PCT/ISA/237) of PCT/CN2023/089137," mailed on Dec. 26, 2023, pp. 1-4.

* cited by examiner

COMBINED STRUCTURE FOR THIN FILM SPUTTERING HIGH-PRECISION SIX-DIMENSIONAL FORCE SENSOR

CROSS-REFERENCE TO RELATED APPLICATION

This application is a continuation of international application of PCT application serial no. PCT/CN2023/089137 filed on Apr. 19, 2023, which claims the priority benefit of China application no. 202310345929.7, filed on Apr. 3, 2023. The entirety of each of the above mentioned patent applications is hereby incorporated by reference herein and made a part of this specification.

BACKGROUND

Technical Field

The present disclosure belongs to the technical field of sensors, and particularly relates to a combined structure for high-precision six-dimensional force sensor capable of realizing a sputtering process.

Description of Related Art

A multi-dimensional force sensor, by sensing force components and moment components in multiple dimensions of space at the same time, is capable to obtain complete force information from complex systems, and is widely used in the fields of intelligent robots, aerospace, automobiles, medicine, etc. A resistance strain-type multi-dimensional force sensor based on a cross-beam structure is currently the most widely used sensor, which converts deformation of the sensor under stress into a voltage change through thin film strain gauges, and achieves the measurement of force components and moment components.

Since most of multi-dimensional force sensors currently developed usually adopt strain gauges pasted in a conventional manner, having the defects such as a low temperature range and performance degradation due to volatilization and condensation of glue. Therefore, it is of great practical significance to sputter thin film strain gauges through the sputtering process.

SUMMARY

In order to solve the above problems, the present disclosure discloses a combined structure for high-precision six-dimensional force sensor capable of realizing a sputtering process. The structure has the advantages of high sensitivity and low inter-dimensional coupling, and is suitable for multi-dimensional force measurement in the aerospace field.

In order to realize the above objective, the present disclosure provides a technical solution as follows:

a combined structure for high-precision six-dimensional force sensor capable of realizing a sputtering process, including a cross beam, a double U-shaped beam, a base, a top cover, a bottom cover and thin film strain gauges;

the cross beam includes a center boss, first main beams, first floating beams and square corners, where the center boss is a cylinder of a cuboid structure and has a square section; four force application holes and four connecting holes are formed on the center boss, a force and its moment act on the center boss through the force application holes, and an upper surface of the center boss is connected with the double U-shaped beam through the four connecting holes; four side surfaces of the center boss are connected with the first main beam; the first main beams are four rectangular beams each with a square section; one end of the main beam is connected with the center boss, and the other end thereof is connected with the first floating beam; the first floating beams are four rectangular thin-walled beams each with a rectangular section; the center of an inner side surface of the first floating beam is connected with the first main beam, and both ends thereof are connected with the square corner; the square corners are four cylinders of a cuboid structure each with a square section; four connecting holes are formed on the square corners for connection with a middle plate of the base; and the center boss is located in the middle of the cross beam, and the first floating beam is on a periphery of the cross beam;

the double U-shaped beam includes an upper U-shaped beam and a lower U-shaped beam, where the upper U-shaped beam includes a second main beam, second floating beams and first supporting legs; the second main beam is a rectangular beam with a groove at the bottom in the middle thereof; two threaded holes are formed at positions of the second main beam close to the center of the cross beam, a bottom boss of the second main beam is connected with the cross beam in a threaded manner, an upper surface thereof is connected with the top cover, the groove thereof is connected with the lower U-shaped beam, and both ends of the second main beam are connected with the second floating beam; the second floating beams are two rectangular thin-walled beams each with a rectangular section, an upper end thereof is connected with the second main beam, and a lower end thereof is connected with the first supporting leg; two connecting holes are formed on the first supporting leg for connection with the middle plate of the base; the lower U-shaped beam includes a third main beam, third floating beams and second supporting legs; the third main beam is a rectangular beam with a groove at the top in the middle thereof; two threaded holes are formed at positions of the third main beam close to the center of the cross beam, a bottom boss of the third main beam is connected with the cross beam in a threaded manner, an upper surface thereof is connected with the top cover, the groove thereof is connected with the upper U-shaped beam, and both ends of the third main beam are connected with the third floating beam; the third floating beams are two rectangular thin-walled beams each with a rectangular section, an upper end thereof is connected with the third main beam, and a lower end thereof is connected with the second supporting leg; and two connecting holes are formed on the second supporting leg for connection with the middle plate of the base;

the upper U-shaped beam and the lower U-shaped beam of the double U-shaped beam are in interference fit through the groove; the double U-shaped beam is connected with the connecting holes of the cross beam in a threaded manner; the connecting holes of the square corners of the cross beam are connected with the middle plate of the base in a threaded manner, the connecting roles of the first supporting leg and the second supporting leg of the double U-shaped beam are connected with the middle plate of base in a threaded manner; the top cover is connected with the force application holes of the cross beam in a threaded manner; and the bottom cover is connected with the base through mounting holes; and the measurement principle of the six-dimensional force sensor is that: 24 thin film strain gauges are sputtered on the main beam to form six sets of Wheatstone bridges, with three sets on the cross beam and three sets on the double U-shaped beam; a total of four strain gauges are arranged on a side surface of the second main beam close to the center of the cross beam, to form a bridge circuit for measuring an acting force Fx in the X direction; a total of four strain gauges are arranged on a side surface of the third main beam close to the center of the cross beam, to form a bridge circuit for measuring an acting force Fy in the Y direction; a total of four strain gauges are arranged on upper and lower surfaces of two beams of the first main beam in the X direction close to the center boss, to form a bridge circuit for measuring an acting force Fz in the Z direction; a total of four strain gauges are arranged on upper and lower surfaces of two beams of the first main beam in the Y direction away from the center boss, to form a bridge circuit for measuring an acting force Mx in the X direction; a total of four strain gauges are arranged on upper and lower surfaces of two beams of the first main beam in the X direction away from the center boss, to form a bridge circuit for measuring an acting force My in the Y direction; and a total of four strain gauges are arranged on a side surface of the second main beam away from the center of the cross beam, to form a bridge circuit for measuring an acting force Mz in the Z direction; when a force/moment of a certain dimension acts on the center of the cross beam, the sensor is deformed and resistance values of thin film strain gauges at corresponding positions change, so that output voltages of corresponding bridges are changed; and a value of the force/moment in each dimension can be obtained by measuring voltage changes.

The present disclosure features the following beneficial effects:

(1) the combined structure for high-precision six-dimensional force sensor capable of realizing a sputtering process designed by the present disclosure avoids the problems of low stability and poor resistance to heat and humidity when a patch method is adopted for the multi-dimensional force sensor, and improves the stability of the sensor;

(2) the combined structure for high-precision six-dimensional force sensor capable of realizing a sputtering process designed by the present disclosure is based on the principle of resistance strain, and a rectangular beam structure is adopted for sensitive parts, thus having high measurement sensitivity;

(3) the combined structure for high-precision six-dimensional force sensor capable of realizing a sputtering process designed by the present disclosure, is a structure of combining the cross beam and the double U-shaped beam, which, by combining the main beam and the floating beams, effectively reduces an inter-dimensional coupling error and has higher measurement accuracy; and (4) the combined structure for high-precision six-dimensional force sensor capable of realizing a sputtering process designed by the present disclosure is simple in structure and easy to process.

DESCRIPTION OF THE EMBODIMENTS

The present disclosure will be further described below with reference to the accompanying drawings and specific embodiments. It should be understood that the following specific embodiments are only used to illustrate the present disclosure and are not intended to limit the scope of the present disclosure.

Figure 1:
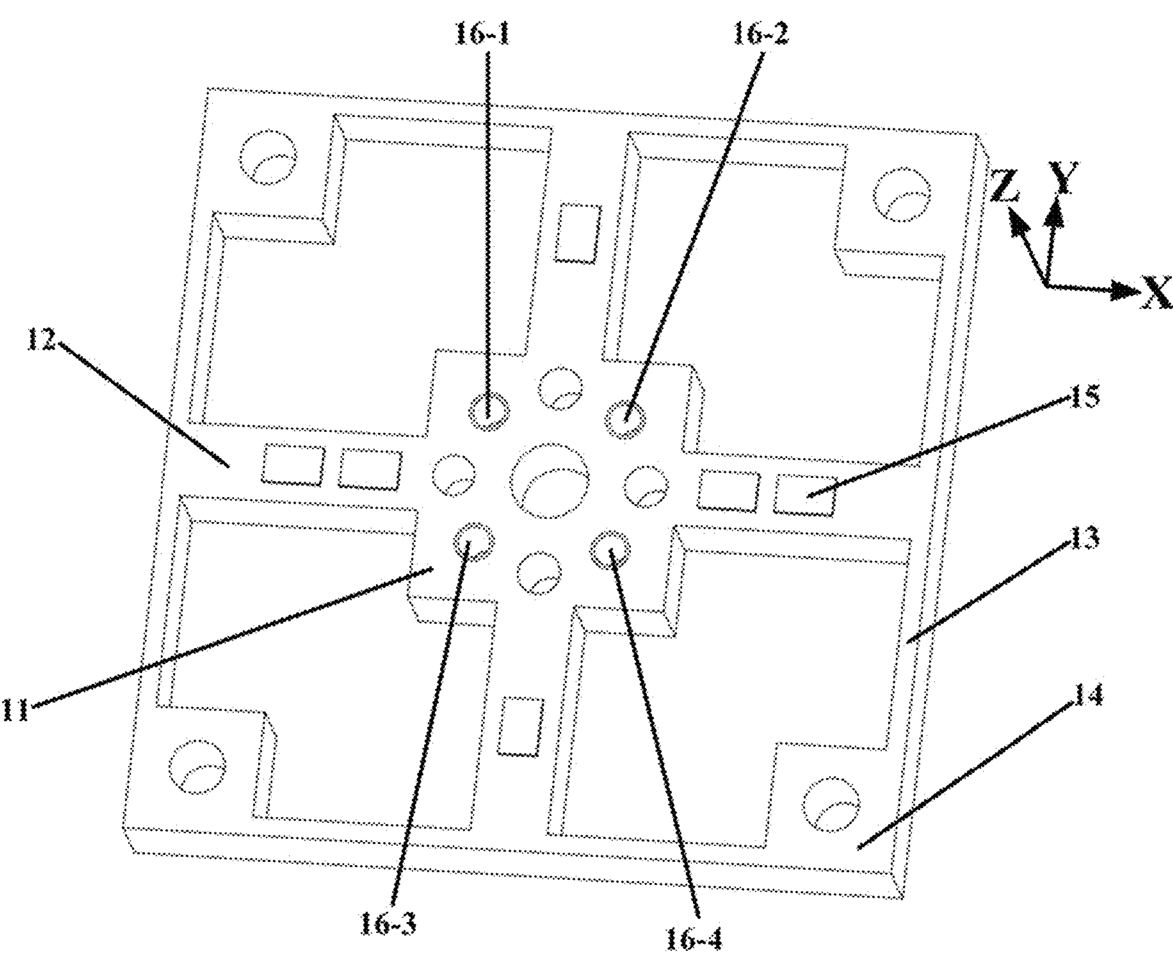
FIG. 1 is a schematic diagram of a structure of a cross beam of the present disclosure.
Figure 5:
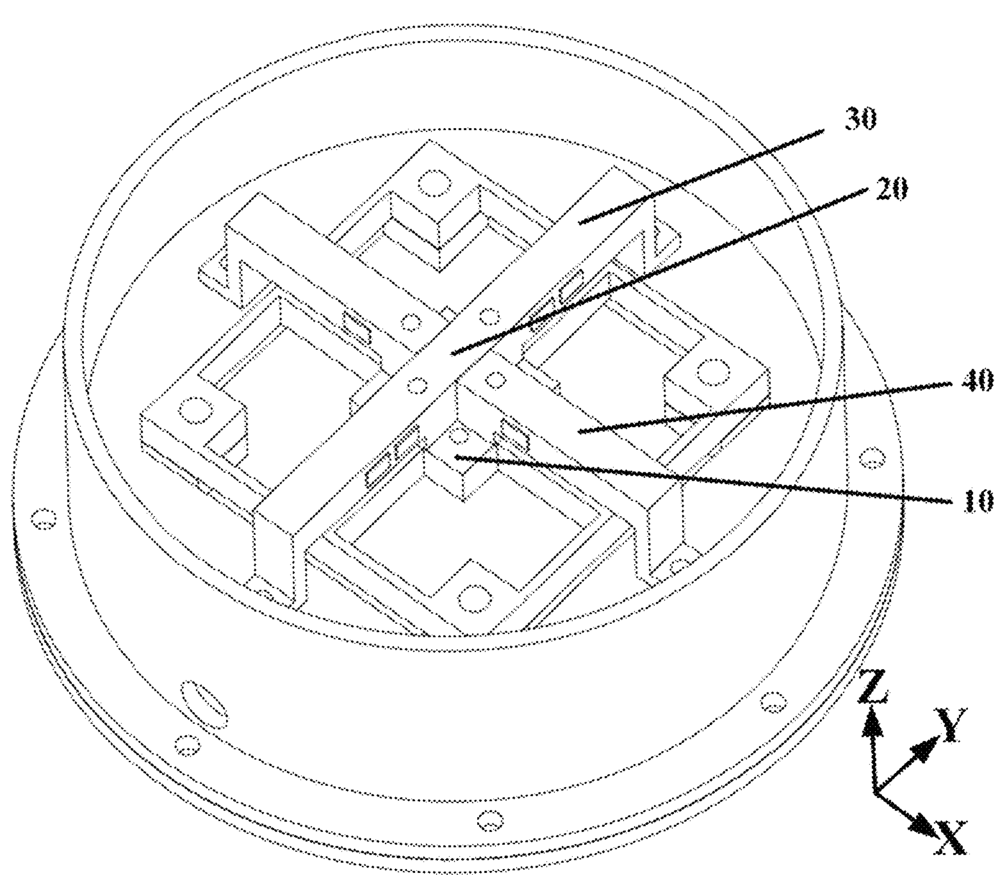
FIG. 5 is a schematic diagram 1 of assembly of the present disclosure.
Figure 6:
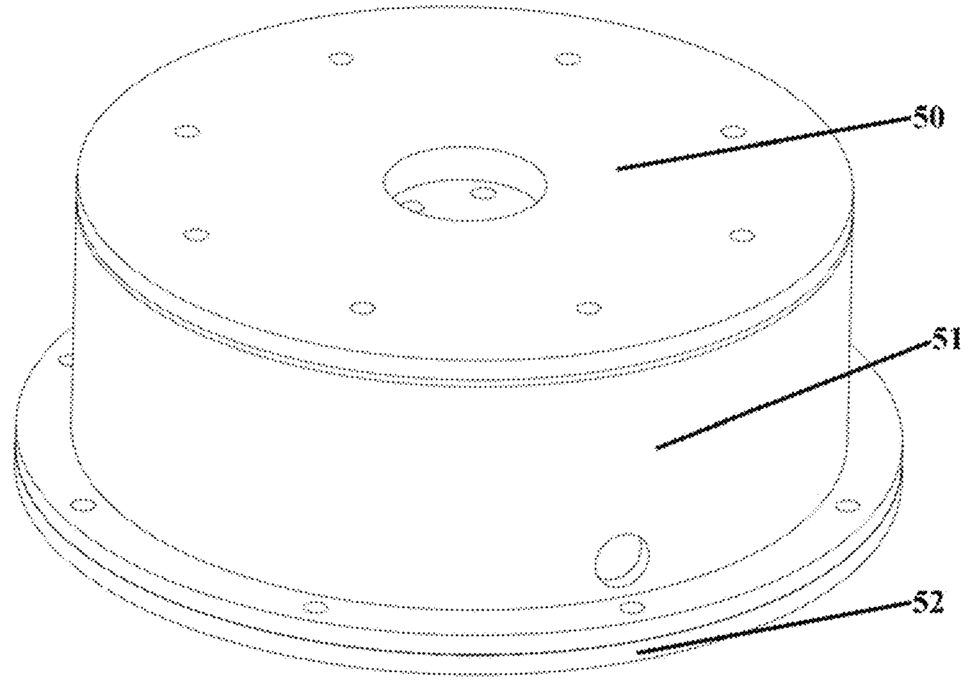
FIG. 6 is a schematic diagram 2 of assembly of the present disclosure.

As shown in FIG. 1 and FIG. 5, in order to describe the direction conveniently, a spatial Cartesian coordinate system as shown in FIG. 1 is established. The present disclosure provides a combined structure for high-precision six-dimensional force sensor capable of realizing a sputtering process. The combined structure of the thin film sputtered high-precision six-dimensional force sensor includes a cross beam 10, a double U-shaped beam 20, a base 51, a top cover 50, a bottom cover 52 and thin film strain gauges 15.

As shown in FIG. 1, the cross beam 10 includes a center boss 11, first main beams 12, first floating beams 13 and square corners 14, where the center boss 11 is a cylinder of a cuboid structure and has a square section; four force application holes 16-1/2/3/4 and four connecting holes are formed on the center boss 11, a force and its moment act on the center boss 11 through the force application holes 16-1/2/3/4, and an upper surface of the center boss 11 is connected with the double U-shaped beam 20 through the four connecting holes; four side surfaces of the center boss 11 are connected with the first main beam 12; the first main beams 12 are four rectangular beams each with a square section; one end of the main beam 12 is connected with the center boss 11, and the other end thereof is connected with the first floating beam 13; the first floating beams 13 are four rectangular thin-walled beams each with a rectangular section; the center of an inner side surface of the first floating beam 13 is connected with the first main beam 12, and both ends thereof are connected with the square corners 14; the square corners 14 are four cylinders of a cuboid structure each with a square section; four connecting holes are formed on the square corners 14 for connection with a middle plate 53 of the base 51; and the center boss 11 is located in the middle of the cross beam 10, and the first floating beam 13 is on a periphery of the cross beam 10.

Figure 2:
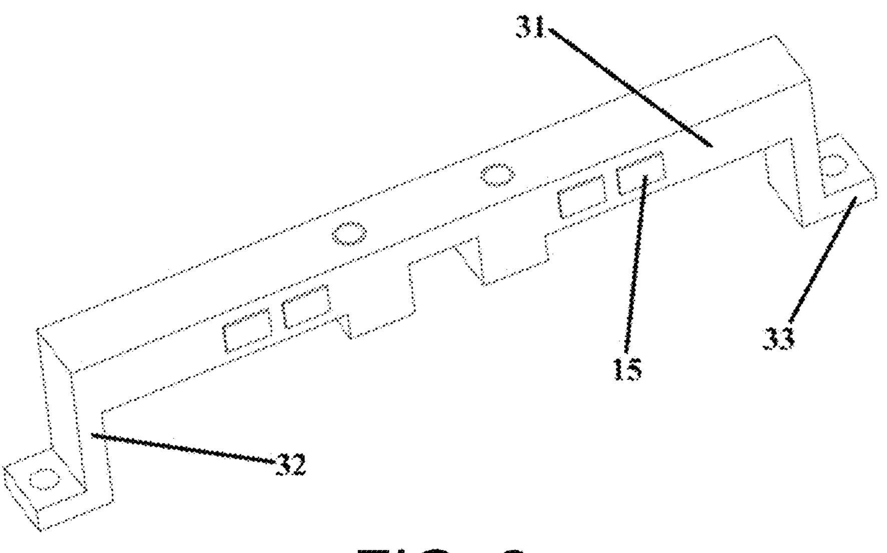
FIG. 2 is a schematic diagram of a structure of an upper U-shaped beam of the present disclosure.
Figure 3:
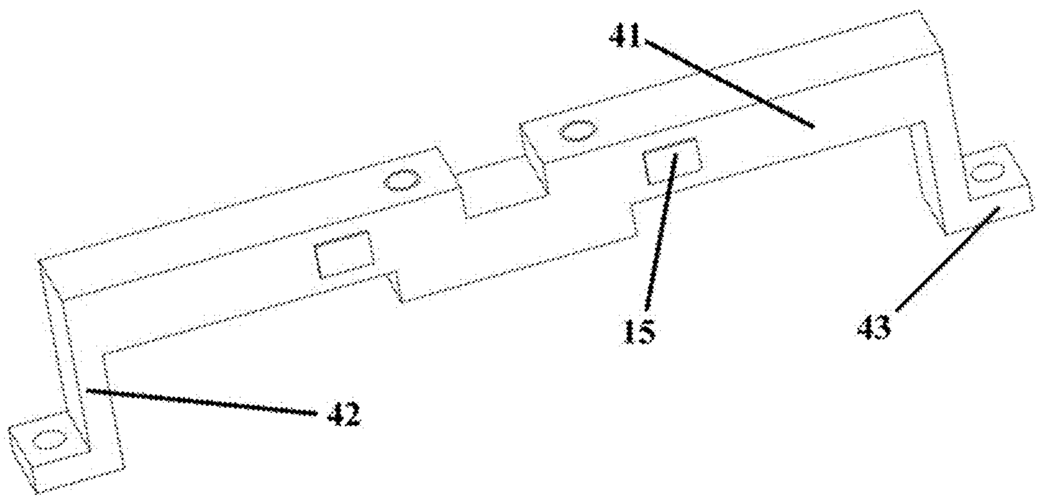
FIG. 3 is a schematic diagram of a structure of a lower U-shaped beam of the present disclosure.
Figure 4:
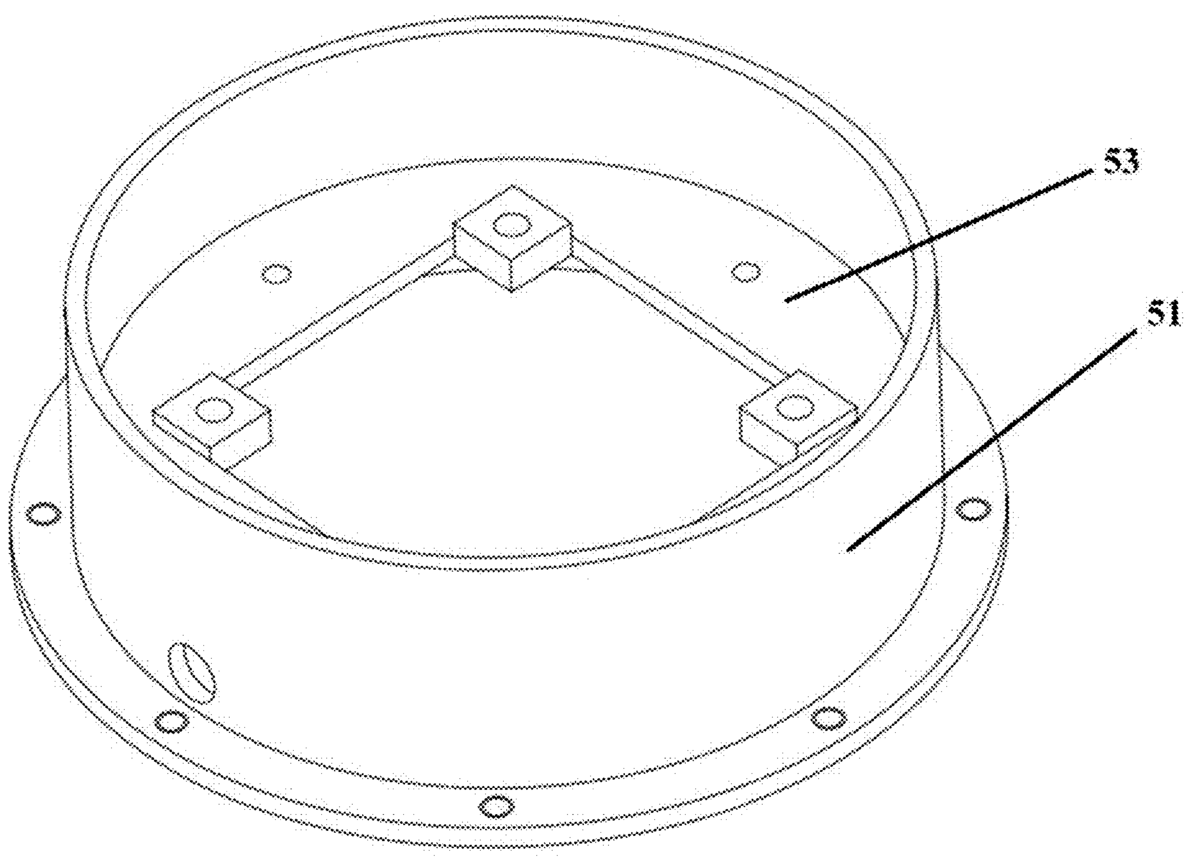
FIG. 4 is a schematic diagram of a structure of a base of the present disclosure.

As shown in FIG. 2 and FIG. 3, the double U-shaped beam 20 includes an upper U-shaped beam 30 and a lower U-shaped beam 40, where the upper U-shaped beam 30 includes a second main beam 31, second floating beams 32 and first supporting legs 33; the second main beam 31 is a rectangular beam with a groove at the bottom in the middle thereof; two threaded holes are formed at positions of the second main beam 31 close to the center of the cross beam, a bottom boss of the second main beam 31 is connected with the cross beam 10 in a threaded manner, an upper surface thereof is connected with the top cover 50, the groove thereof is connected with the lower U-shaped beam 40, and both ends of the second main beam 31 are connected with the second floating beam 32; the second floating beams 32 are two rectangular thin-walled beams each with a rectangular section, an upper end thereof is connected with the second main beam 31, and a lower end thereof is connected with the first supporting leg 33; two connecting holes are formed on the first supporting leg 33 for connection with the middle plate 53 of the base 51; the lower U-shaped beam 40 includes a third main beam 41, third floating beams 42 and second supporting legs 43; the third main beam 41 is a rectangular beam with a groove at the top in the middle thereof; two threaded holes are formed at positions of the third main beam 41 close to the center of the cross beam, a bottom boss of the third main beam 41 is connected with the cross beam 10 in a threaded manner, an upper surface thereof is connected with the top cover 50, the groove thereof is connected with the upper U-shaped beam 30, and both ends of the third main beam 41 are connected with the third floating beam 42; the third floating beams 42 are two rectangular thin-walled beams each with a rectangular section, an upper end thereof is connected with the third main beam 41, and a lower end thereof is connected with the second supporting leg 43; and two connecting holes are formed on the second supporting leg 43 for connection with the middle plate 53 of the base 51.

As shown in FIG. 5, the upper U-shaped beam 30 and the lower U-shaped beam 40 of the double U-shaped beam 20 are in interference fit through the groove; the double U-shaped beam 20 is connected with the connecting holes of the cross beam 10 in a threaded manner; the connecting holes of the square corners 14 of the cross beam 10 are connected with the middle plate 53 of the base 51 in a threaded manner, the connecting roles of the first supporting leg 33 and the second supporting leg 43 of the double U-shaped beam 20 are connected with the middle plate 53 of base 51 in a threaded manner; the top cover 50 is connected with the force application holes 16-1/2/3/4 of the cross beam 10 in a threaded manner; and the bottom cover 52 is connected with the base 51 through mounting holes.

Figure 7:
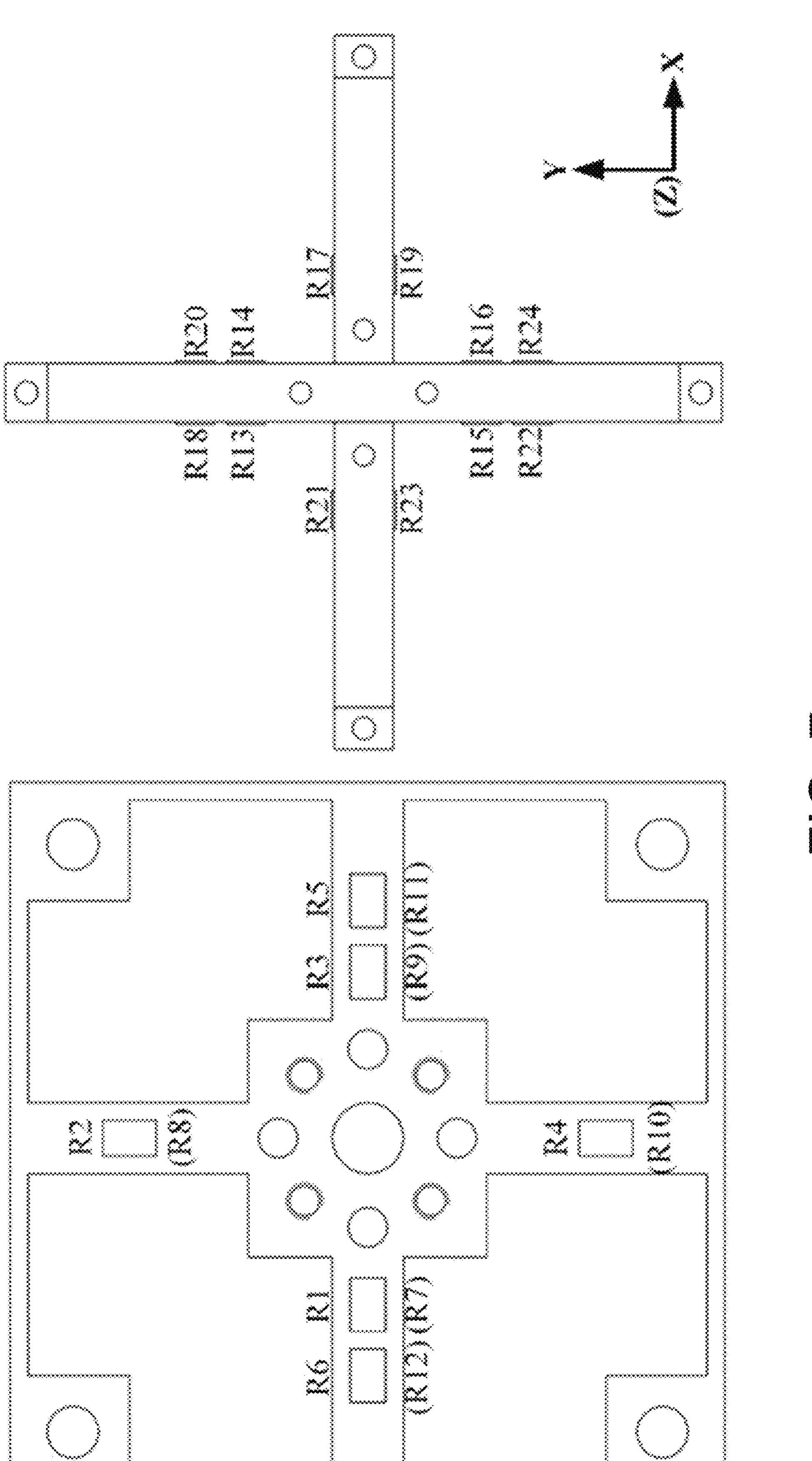
FIG. 7 is a schematic diagram of patch positions of thin film strain gauges of the present disclosure.

FIG. 7 shows patch positions and corresponding numbers R1-R24 of a total of 24 thin film strain gauges of the present disclosure. All thin film strain gauges are identical except for their numbers, that is, they have the same initial resistance value, the resistance value decreases during contraction thereof, and the resistance value increases during extension. The thin film strain gauges are sputtered at the positions where strain is the largest when the first main beams, the second main beam and the third main beam are stressed. The strain gauges R1 and R7 on the first main beam are sputtered separately on upper and lower surfaces of a rectangular beam in the negative X direction close to the center boss, the strain gauges R3 and R9 on the first main beam are sputtered separately on upper and lower surfaces of a rectangular beam in the positive X direction close to the center boss, the strain gauges R2 and R8 on the first main beam are sputtered separately on upper and lower surfaces of a rectangular beam in the positive Y direction away from the center boss, the strain gauges R4 and R10 on the first main beam are sputtered separately on upper and lower surfaces of a rectangular beam in the negative Y direction away from the center boss, the strain gauges R5 and R11 on the first main beam are sputtered separately on upper and lower surfaces of a rectangular beam in the positive X direction away from the center boss, the strain gauges R6 and R12 on the first main beam are sputtered separately on upper and lower surfaces of a rectangular beam in the negative X direction away from the center boss, the strain gauges R13 and R14 on the second main beam are sputtered separately on left and right side surfaces of a rectangular beam in the positive Y direction close to the center of the cross beam, the strain gauges R15 and R16 on the second main beam are sputtered separately on left and right side surfaces of a rectangular beam in the negative Y direction close to the center of the cross beam, the strain gauges R17 and R19 on the third main beam are sputtered separately on left and right side surfaces of a rectangular beam in the positive X direction close to the center of the cross beam, the strain gauges R21 and R23 on the third main beam are sputtered separately on left and right side surfaces of a rectangular beam in the negative X direction close to the center of the cross beam, the strain gauges R18 and R20 on the second main beam are sputtered separately on left and right side surfaces of a rectangular beam in the positive Y direction away from the center of the cross beam, the strain gauges R22 and R24 on the second main beam are sputtered separately on left and right side surfaces of a rectangular beam in the negative Y direction away from the center of the cross beam, and all thin film strain gauges are sputtered at the positions where strain is the largest when the first main beams, the second main beam and the third main beam are stressed.

Figure 8:
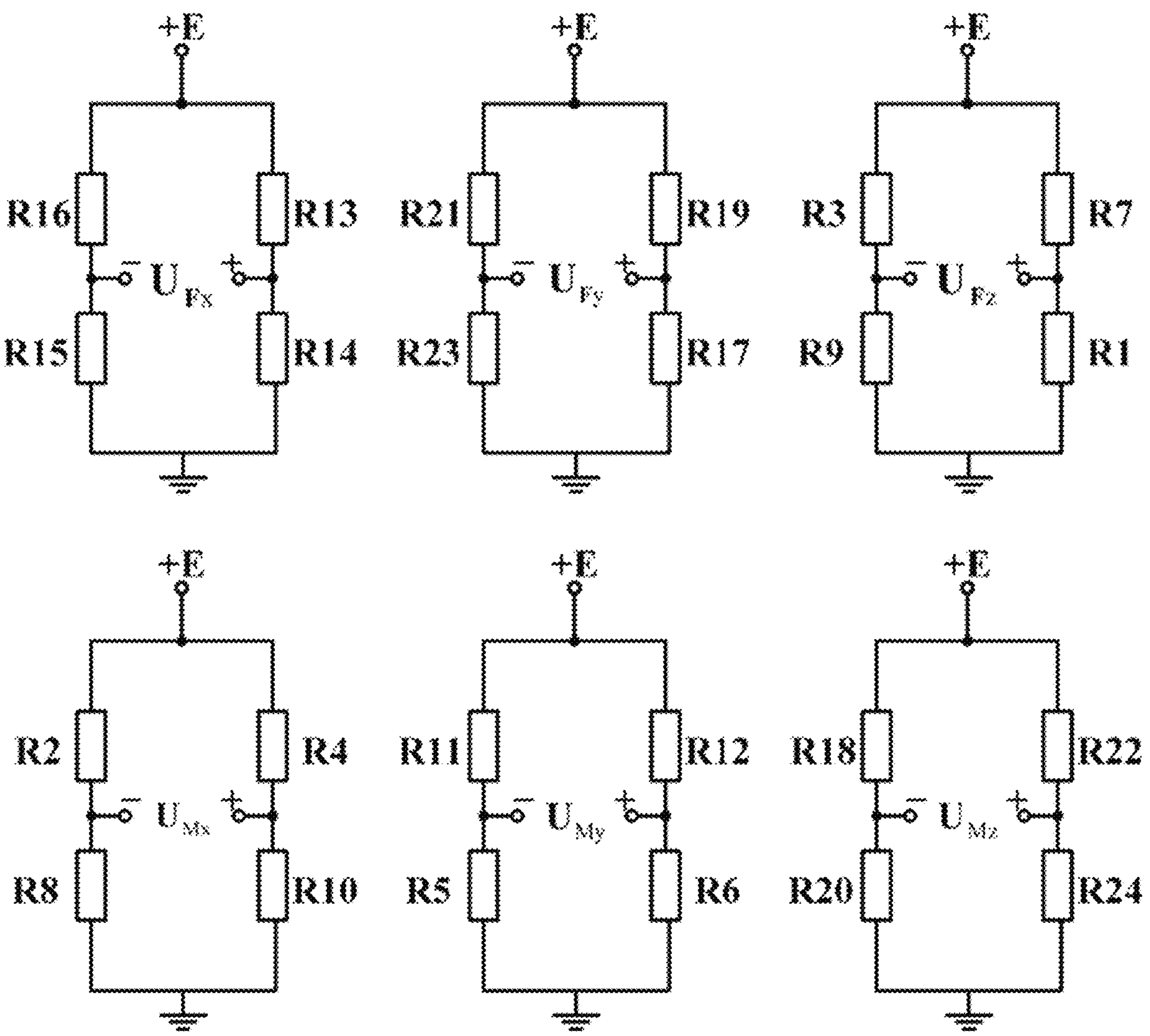
FIG. 8 is a schematic diagram of six sets of bridge circuits of the present disclosure.

FIG. 8 shows six sets of Wheatstone bridges formed by six channels of strain gauges. The strain gauges R13, R14, R15 and R16 form a Wheatstone bridge for measuring an acting force Fx in the X direction; the strain gauges R17, R19, R21 and R23 form a Wheatstone bridge for measuring an acting force Fy in the Y direction; the strain gauges R1, R3, R7 and R9 form a Wheatstone bridge for measuring an acting force Fz in the Z direction; the strain gauges R2, R4, R8 and R10 form a Wheatstone bridge for measuring an applied moment Mx in the X direction; the strain gauges R5, R6, R11 and R12 form a Wheatstone bridge for measuring an applied moment My in the Y direction; and the strain gauges R18, R20, R22 and R24 form a Wheatstone bridge for measuring an applied moment Mz in the Z direction.

The measurement principle of the six-dimensional force sensor is that: an input force/moment of a certain dimension acts on the center of the cross beam and the center of the double U-shaped beam, so that the sensor is deformed and resistance values of thin film strain gauges at corresponding positions change, thereby changing output voltages of corresponding bridges. In addition, due to the special design of the structure, output voltages of other dimensions will not change significantly, which effectively reduces the inter-dimensional coupling interference, thereby improving the measurement accuracy of the sensor. Therefore, during use, it is only necessary to measure voltage changes of all six channels to obtain a value of the force/moment in each dimension. It is assumed that R0 represents a value of zero-point resistance of the strain gauges, and $\Delta R_{Fx}$, $\Delta R_{Fy}$, $\Delta R_{Fz}$, $\Delta R_{Mx}$, $\Delta R_{My}$ and $\Delta R_{Mz}$ represent resistance changes of the strain gauges under the action of Fx, Fy, Fz, Mx, My and Mz respectively. Voltage changes of the output voltage of each channel are as follows:

$$\Delta U_{Fx} = \left(\frac{R14+\Delta R_{Fx}}{R13+R14} - \frac{R15-\Delta R_{Fx}}{R15+R16}\right)E = \left(\frac{R0+\Delta R_{Fx}}{2R0} - \frac{R0-\Delta R_{Fx}}{2R0}\right)E = \frac{\Delta R_{Fx}}{R0}E$$

$$\Delta U_{Fy} = \left(\frac{R17+\Delta R_{Fy}}{R17+R19} - \frac{R23-\Delta R_{Fy}}{R21+R23}\right)E = \left(\frac{R0+\Delta R_{Fy}}{2R0} - \frac{R0-\Delta R_{Fy}}{2R0}\right)E = \frac{\Delta R_{Fy}}{R0}E$$

$$\Delta U_{Fz} = \left(\frac{R1+\Delta R_{Fz}}{R1+R7} - \frac{R9-\Delta R_{Fz}}{R3+R9}\right)E = \left(\frac{R0+\Delta R_{Fz}}{2R0} - \frac{R0-\Delta R_{Fz}}{2R0}\right)E = \frac{\Delta R_{Fz}}{R0}E$$

$$\Delta U_{Mx} = \left(\frac{R10+\Delta R_{Mx}}{R4+R10} - \frac{R8-\Delta R_{Mx}}{R2+R8}\right)E = \left(\frac{R0+\Delta R_{Mx}}{2R0} - \frac{R0-\Delta R_{Mx}}{2R0}\right)E = \frac{\Delta R_{Mx}}{R0}E$$

$$\Delta U_{My} = \left(\frac{R6+\Delta R_{My}}{R6+R12} - \frac{R5-\Delta R_{My}}{R5+R11}\right)E = \left(\frac{R0+\Delta R_{My}}{2R0} - \frac{R0-\Delta R_{My}}{2R0}\right)E = \frac{\Delta R_{My}}{R0}E$$

$$\Delta U_{Mz} = \left(\frac{R24+\Delta R_{Mz}}{R22+R24} - \frac{R20-\Delta R_{Mz}}{R18+R20}\right)E = \left(\frac{R0+\Delta R_{Mz}}{2R0} - \frac{R0-\Delta R_{Mz}}{2R0}\right)E = \frac{\Delta R_{Mz}}{R0}E.$$

It should be noted that the above content is merely used for explaining the technical idea of the present disclosure, and cannot limit the protection range of the present disclosure. Those of ordinary skill in the art may also make some improvements and modifications without departing from the principle of the present disclosure, and these improvements and modifications should also fall within the scope of protection determined in the claims of the present disclosure.

What is claimed is:

1. A combined structure of a thin film sputtered high-precision six-dimensional force sensor, comprising a cross beam, a double U-shaped beam, a base, a top cover, a bottom cover and thin film strain gauges; wherein the cross beam comprises a center boss, first main beams, first floating beams and square corners, wherein the center boss is a cylinder of a cuboid structure and has a square section; four force application holes and four connecting holes are formed on the center boss, a force and a moment of the force act on the center boss through the four force application holes, and an upper surface of the center boss is connected with the double U-shaped beam through the four connecting holes; four side surfaces of the center boss are connected with the first main beams; the first main beams are four rectangular beams each with a square section; one end of each of the first main beams is connected with the center boss, and the other end of the each of the first main beams is connected with the one of the first floating beams; the first floating beams are four rectangular thin-walled beams each with a rectangular section; a center of an inner side surface of each of the first floating beams is connected with the each of the first main beams, and both ends of the each of the first floating beams are connected with the square corners; the square corners are four cylinders of a cuboid structure each with a square section; other four connecting holes are formed on the square corners for connection with a middle plate of the base; and the center boss is located in a middle of the cross beam, and the first floating beams is on a periphery of the cross beam;

the double U-shaped beam comprises an upper U-shaped beam and a lower U-shaped beam, wherein the upper U-shaped beam comprises a second main beam, second floating beams and first supporting legs; the second main beam is a rectangular beam with a groove at a bottom in a middle of the second main beam; two threaded holes are formed at positions of the second main beam close to a center of the second main beam, a bottom boss of the second main beam is connected with the cross beam in a threaded manner, an upper surface of the second main beam is connected with the top cover, the groove of the second main beam is connected with the lower U-shaped beam, and both ends of the second main beam are connected with the second floating beams; the second floating beams are two rectangular thin-walled beams each with a rectangular section, an upper end of each of the second floating beams is connected with the second main beam, and a lower end of the each of the second floating beams is connected with the each of the first supporting legs; two connecting holes are formed on the first supporting legs for connection with the middle plate of the base; the lower U-shaped beam comprises a third main beam, third floating beams and second supporting legs; the third main beam is a rectangular beam with an other groove at a top in a middle of the third main beam; other two threaded holes are formed at positions of the third main beam close to a center of the third main beam, a bottom boss of the third main beam is connected with the cross beam in a threaded manner, an upper surface of the third main beam is connected with the top cover, the other groove of the third main beam is connected with the upper U-shaped beam, and both ends of the third main beam are connected with the third floating beams; the third floating beams are two rectangular thin-walled beams each with a rectangular section, an upper end of each of the third floating beams is connected with the third main beam, and a lower end of the each of the third floating beams is connected with the second supporting legs; and other two connecting holes are formed on the second supporting legs for connection with the middle plate of the base;

the upper U-shaped beam and the lower U-shaped beam of the double U-shaped beam are in interference fit through the groove of the second main beam and the other groove of the third main beam; the double U-shaped beam is connected with the four connecting holes of the center boss in a threaded manner; the other four connecting holes of the square corners of the cross beam are connected with the middle plate of the base in a threaded manner, the two connecting holes of the first supporting legs and the other two connecting holes of the second supporting legs of the double U-shaped beam are connected with the middle plate of base in a threaded manner; the top cover is connected with the four force application holes of the cross beam in a threaded manner; and the bottom cover is connected with the base through mounting holes; and the thin film strain gauges are identical, a number of the strain gauges are 24, the strain gauges have corresponding numbers R1-R24, and the strain gauges are sputtered at the positions wherein a strain is the largest when the first main beams, the second main beam and the third main beam are stressed; a strain gauge R1 and a strain gauge R7 on a first one of the first main beams are sputtered separately on an upper surface of the first one of the first main beams and a lower surface of the first one of the first main beams in a negative X direction close to the center boss, a strain gauge R3 and a strain gauge R9 on a second one of the first main beams are sputtered separately an upper surface of the second one of the first main beams and a lower surface of the second one of the first main beams in a positive X direction close to the center boss, a strain gauge R2 and a strain gauge R8 on a third one of the first main beams are sputtered separately on an upper surface of the third one of the first main beams and a lower surface of the third one of the first main beams in a positive Y direction away from the center boss, a strain gauge R4 and a strain gauge R10 on a fourth one of the first main beams are sputtered separately on an upper surface of the fourth one of the first main beams and a lower surface of the fourth one of the first main beams in a negative Y direction away from the center boss, a strain gauge R5 and a strain gauge R11 on the second one of first main beams are sputtered separately on the upper surface of the second one of the first main beams and the lower surface of the second one of the first main beams in the positive X direction away from the center boss, a strain gauge R6 and a strain gauge R12 on the first one of the first main beams are sputtered separately on the upper surface of the first one of the first main beams and the lower surface of the first one of the first main beams in the negative X direction away from the center boss, a strain gauge R13 and a strain gauge R14 on the second main beam are sputtered separately on a left side surface of the second main beam and a right side surface of the second main beam in the positive Y direction close to a center of the cross beam, a strain gauge R15 and a strain gauge R16 on the second main beam are sputtered separately on the left side surface of the second main beam and a right side surface of the second main beam in the negative Y direction close to the center of the cross beam, a strain gauge R17 and a strain gauge R19 on the third main beam are sputtered separately on a left side surface of the third main beam and a right side surface of the third main beam in the positive X direction close to the center of the cross beam, a strain gauge R21 and a strain gauge R23 on the third main beam are sputtered separately on the left side surface of the third main beam and a right side surface of the third main beam in the negative X direction close to the center of the cross beam, a strain gauge R18 and a strain gauge R20 on the second main beam are sputtered separately on the left side surface of the second main beam and a right side surface of the second main beam in the positive Y direction away from the center of the cross beam, a strain gauge R22 and a strain gauge R24 on the second main beam are sputtered separately on the left side surface of the second main beam and a right side surface of the second main beam in the negative Y direction away from the center of the cross beam.

2. A measurement method of the combined structure of the thin film sputtered high-precision six-dimensional force sensor according to claim 1, wherein the 24 thin film strain gauges are sputtered on the first main beams, second main beam and the third main beam to form six sets of Wheatstone bridges, with three sets of the Wheatstone bridges on the cross beam and other three sets of the Wheatstone bridges on the double U-shaped beam; a total of four strain gauges are arranged on side surfaces of the second main beam close to the center of the cross beam, to form a bridge circuit for measuring an acting force Fx in a X direction; a total of four strain gauges are arranged on side surfaces of the third main beam close to the center of the cross beam, to form a bridge circuit for measuring an acting force Fy in a Y direction; a total of four strain gauges are arranged on upper surfaces of two of the first main beams and lower surfaces of two of the first main beams in the X direction close to the center boss, to form a bridge circuit for measuring an acting force Fz in the Z direction; a total of four strain gauges are arranged on upper surfaces of two of the first main beams and lower surfaces of two of the first main beams in the Y direction away from the center boss, to form a bridge circuit for measuring an applied moment Mx in the X direction; a total of four strain gauges are arranged on upper surfaces of two of the first main beams and lower surfaces of two of the first main beams in the X direction away from the center boss, to form a bridge circuit for measuring an applied moment My in the Y direction; and a total of four strain gauges are arranged on side surfaces of the second main beam away from the center of the cross beam, to form a bridge circuit for measuring an applied moment Mz in the Z direction; and when a force/moment of a certain dimension acts on the center of the cross beam, the combined structure of the thin film sputtered high-precision six-dimensional force sensor is deformed and resistance values of thin film strain gauges at corresponding positions change, output voltages of corresponding Wheatstone bridges are changed, and a value of the force/moment in each dimension is obtained by measuring voltage changes.

* * * * *